(12) United States Patent
Fan et al.

(10) Patent No.: US 6,277,302 B1
(45) Date of Patent: *Aug. 21, 2001

(54) INHIBITION OF METAL CORROSION

(75) Inventors: Lai-Duien Grace Fan; Joseph C. Fan, both of Lake Zurich, IL (US)

(73) Assignee: Donlar Corporation, Bedford Park, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,351

(22) Filed: Oct. 21, 1998

(51) Int. Cl.[7] ............................ C23F 11/10; C23F 11/173

(52) U.S. Cl. .......................... 252/389.52; 252/389.54; 252/389.62; 422/7; 422/17; 422/19

(58) Field of Search .................... 252/389.52, 389.62, 252/389.54, 396; 210/701; 422/7, 17, 19

(56) References Cited

U.S. PATENT DOCUMENTS

| | | | | |
|---|---|---|---|---|
| 4,885,136 | * | 12/1989 | Katayama | 422/15 |
| 4,913,880 | * | 4/1990 | Chen | 422/15 |
| 4,971,724 | | 11/1990 | Kalota et al. | 252/390 |
| 5,531,934 | | 7/1996 | Freeman et al. | 252/390 |
| 5,607,623 | | 3/1997 | Benton et al. | 252/392 |
| 5,616,544 | * | 4/1997 | Kalota et al. | 508/508 |
| 5,776,875 | | 7/1998 | Tang et al. | 510/247 |
| 5,871,691 | * | 2/1999 | Carey | 422/17 |

* cited by examiner

*Primary Examiner*—Margaret Medley
*Assistant Examiner*—Cephia D. Toomer
(74) *Attorney, Agent, or Firm*—Olson & Hierl, Ltd.

(57) ABSTRACT

A composition and method is disclosed for inhibiting the corrosion of metals in contact with an aqueous system capable of corroding the metal. The inventive composition contains a substantially water-soluble polymer of an acidic amino acid and at least one water-soluble salt of molybdenum or zinc. The composition is substantially non-toxic and environmentally acceptable and is supplied in a corrosion-inhibition amount to the otherwise metal-corrosive aqueous system.

23 Claims, No Drawings

INHIBITION OF METAL CORROSION

TECHNICAL FIELD

This invention relates to a composition and method for inhibiting the corrosion of metals in an aqueous system. More particularly, the invention is directed to the use of a substantially water-soluble, polymer of an acidic amino acid and at least one water-soluble salt of molybdenum or zinc.

BACKGROUND OF THE INVENITON

The corrosion of metal equipment is a widespread and expensive problem in many industrial settings such as open recirculating cooling towers and in the agricultural industry in fertilizer storage and irrigation systems. Expenses arise due to corrosion from lost production time and from costly repairs and replacement of metal equipment parts that have been weakened or destroyed by the action of water and oxygen at the metal surface.

Many environmental factors can accelerate the corrosion rate of metals, and ferrous metals in particular, in aqueous systems. For example, a high content of dissolved oxygen in an aqueous system has a significant oxidative influence on the corrosion rate of many metals. Inert gas purging or blanketing of aqueous systems can minimize the oxygen content of the aqueous solution to decrease the rate of corrosion, but this approach is limited to closed systems. Another factor is the temperature of the aqueous system. A reduction in the temperature of the aqueous system can decrease the rate of corrosion providing the reduced temperature can be tolerated and controlled. Similarly, a reduction in the velocity or movement of the aqueous system through the equipment can also reduce the rate of corrosion. However, some flow is essential to maintain corrosion protection when utilizing corrosion inhibitors. Finally, maintaining a pH value of about 7 units or greater in the aqueous system can lessen the corrosion rate of metals caused by acid attack.

Another important means of retarding corrosion in aqueous systems is the use of various chemical additives as "corrosion inhibitors." It is believed that these additives inhibit the rate of corrosion by forming surface films which physically block the diffusion of ions to and from the surface of the metal. Some of these corrosion inhibitors are organic polymers, others are salts of toxic metals such as chromium, still others are phosphorous-containing complexes. See, for example, Little et. al., "Corrosion Inhibition by Thermal Polyaspartate," *Surface Reactive Peptides and Polymers: Discovery and Commercialization*, Sikes, C. S. and Wheeler, A. P. (Eds.), ACS Symposium Series No. 444 (1990). However, many of these chemical additives have a negative environmental impact given their toxicity and persistence.

In industrial water treatment applications, such as open recirculating cooling systems, and boilers, the formation of scale and corrosion is a major problem. The growth of mineral crystals (scale formation) on heat transfer surfaces leads to decreased heat transfer efficiency and increases corrosion of heat transfer components. Corrosion of the heat transfer components can lead to costly replacements and failures. The addition of chemicals to reduce scale is well known. In many cases, phosphorus-containing materials are used to inhibit scale. However, when released into the environment, many of these materials can have a negative environmental impact. Polymeric organic inhibitors of scale are also known, such as polyacrylic acid, polymaleic acid, copolymers of acrylic and maleic acid, copolymers of acrylic acid and acrylamide, and the like. These polymeric materials, while being good scale inhibitors, are not known to have corrosion inhibition activity. Moreover, these materials are also not readily biodegradable, and thus can contribute to the overall chemical burden on the environment for long periods of time.

The performance of polymers as mineral scale inhibitors is dependent on the ability of the polymers to interact with growth sites on the surface of growing mineral crystals to retard mineral formation and reduce the adherence of the mineral to heat transfer surfaces by changing the crystal morphology.

Therefore, a need exists for an effective and environmentally tolerable polymeric corrosion inhibitor that can be used to inhibit corrosion and mineral scale on metal in contact with a metal-corrosive aqueous systems. Some previous attempts to fulfill this need employed a solution containing aspartic acid homopolymers to inhibit the corrosion of metals in aqueous systems of basic pH (U.S. Pat. No. 4,971,724 to Kalota et al.); an aqueous detergent solution combined with homopolymers of aspartic acid or glutamic acid (U.S. Pat. No. 5,531,934 to Freeman et al.); and polyaspartate salts having alkali or alkaline earth metal counterions as corrosion inhibitors in an aqueous saline environment (U.S. Pat. No. 5,607,623 to Benton et al.). However, corrosion inhibition has met with limited success.

The present invention provides for both scale and corrosion inhibition benefits in a single, substantially non-toxic, environmentally acceptable polymer-containing composition.

SUMMARY OF THE INVENTION

A composition and method for inhibiting corrosion of metals in contact with an aqueous system capable of corroding the metal is provided. The inventive method comprises supplying to the aqueous system a metal corrosion-inhibiting amount of a composition comprising a substantially water-soluble polymer of at least one acidic amino acid and at least one water-soluble salt of molybdenum or zinc.

The present inventive composition and method surprisingly is effective in inhibiting both corrosion and mineral scale on metal, particularly ferrous metal, in contact with an otherwise metal corrosive aqueous systems.

The acidic amino acid polymers useful in the compositions and methods of the present invention are biodegradable, have low toxicity, have low calcium sensitivity, provide scale control, and provide corrosion control. Acidic amino acid polymers, in combination with water-soluble molybdate salts, zinc salts, and mixtures thereof, beneficially provide unexpectedly improved corrosion control without sacrificing the beneficial attributes of the polymers. Surprisingly, the corrosion inhibiting effect of the inventive composition is significantly greater than the mere additive corrosion inhibiting effect of the individual components.

The compositions and methods of the present invention beneficially inhibit mineral scale and in particular, provide both scale and corrosion inhibiting functionality in a single composition. It is very common for both mineral scale and corrosion to be problems in the same application or system and conventionally require the use of multiple compositions to alleviate both scale and corrosion.

The inventive compositions and method are particularly suitable for use in metal corrosive aqueous systems encountered in such industrial water treatment applications as open recirculating cooling towers, boilers and the like and in such agricultural applications as agricultural fertilizer systems, agricultural irrigation systems and the like.

In the agriculture industry, in particular, the storage and application of fertilizer solutions can be problematic due to the corrosive nature of such fertilizer solutions to metals such as mild steel. The present invention provides effective and environmentally acceptable compositions and methods for the inhibition of corrosion of metals in contact with known metal-corrosive aqueous fertilizer solutions. Particular preferred compositions comprising a substantially water-soluble acidic amino acid polymer, particularly polyaspartate, and at least one water-soluble molybdate or zinc salt, were found to inhibit the corrosion of mild steel in the presence of an aqueous solution of a fertilizer, such as urea and ammonium nitrate.

An additional benefit of the inventive compositions can be realized in the agriculture industry since they can concurrently supply acidic amino acid polymers, which can also enhance plant productivity, as disclosed in U.S. Pat. No. 5,350,735 to Kinnersley, et al., and the micro nutrient plant minerals, molybdenum or zinc or both.

DETAILED DESCRIPTION OF THE PREFERRED EMBODIMENTS

The terms "acidic amino acid polymer," or any grammatical variations thereof, and "poly(aminoacids) are used interchangeably and shall include the homopolymer and copolymers of the acid form of the amino acid as well as their salts. The salts of the acidic amino acid polymers may be alkali metal salts, alkaline earth metal salts, ammonium salts $C_1$–$C_{20}$, alkyl ammonium salts or aryl ammonium salts. The term "polymer" as used herein includes homopolymers and copolymers of acidic amino acid. The term "copolymer" as used herein includes random and block copolymers of acidic amino acid and their salts.

The inventive compositions contain a biodegradable and substantially non-toxic corrosion inhibiting amount of at least one substantially water-soluble polymer of an acidic amino acid together with at least one substantially water-soluble molybdate or zinc metal salt. The term "molybdate salt" as used herein defines a substantially non-toxic, water-soluble inorganic metal salt of molybdenum having the general formula (I): $(X)_n(MoO_4)_m$, wherein X is a cation, n and m are integers and the cationic charge on X times n is equal to 2m. The term "zinc salt" as used herein defines a substantially non-toxic water-soluble inorganic metal salt of zinc having the general formula (II): $(Zn)_p(Y)_q$, wherein Y is an anion, p and q are integers and the anionic charge on Y times q is equal to 2p. For convenience, the term "metal salt" is used herein to refer to molybdate and zinc salts.

Preferably, the molybdate salt has an alkali metal cation and most preferably is sodium molybdate ($Na_2MoO_4$). Preferably, the zinc salt has an anion derived from an inorganic mineral acid and most preferably is zinc chloride ($ZnCl_2$) or a hydrate thereof.

Surprisingly, the corrosion inhibiting effect of the inventive compositions is considerably greater than the additive corrosion inhibiting effect, if any, attributable to the individual components.

Particularly preferred acidic amino acid polymers are synthesized from acidic amino acids, such as aspartic acid, in either α form, β form, or optionally containing a cyclic imide (succinimide), as well as glutamic acid in either α form, or γ form, or a derivative thereof. Preferably, the molecular size of the acidic amino acid polymer is in the range of about 1,000 to about 100,000 daltons, more preferably in the range of about 1,000 to about 20,000 daltons. The acidic amino acid residue content of the polymer is preferably in the range of about 20 mole percent to about 100 mole percent.

Preferably, the acidic amino acid polymer is a homopolymer of polyaspartic acid, or polyglutamic acid or is a block or random copolymer containing:

a) at least one amino acid derived moiety selected from the group consisting of aspartic acid and glutamic acid; and b) one or more co-monomers selected from the group consisting of polybasic carboxylic acids and anhydrides, fatty acids, polybasic hydroxycarboxylic acids, monobasic polyhydroxycarboxylic acids, aliphatic amines, diamines and triamines, polyamines, carbohydrates, sugar carboxylic acids, amino acids, non-protein forming aminocarboxylic acids, lactams, lactones, diols, triols, polyols, unsaturated monocarboxylic, dicarboxylic and tricarboxylic acids, derivatized aspartic acid residues, derivatized glutamic acid residues; and the sum of the residues of aspartic acid, glutamic acid or mixture thereof comprises at least about 20% of the total number of residues in the polymer.

Acidic amino acid polymers useful in the compositions and methods of the present invention can be synthesized by any of numerous methods known in the chemical arts. See, for example, Koskan et al.; U.S. Pat. Nos. 5,057,597; 5,116,513; 5,219,952, and 5,221,733, the disclosures of which are incorporated by reference, which describe methods for the manufacture of polysuccinimide and polyaspartic acid. Other methods can be found in U.S. Pat. No. 5,142,062 which describes the use of phosphoric anhydride to facilitate the polymerization of aspartic acid to polysuccinimide. Polyaspartic acid salts are obtained by the alkaline hydrolysis of polysuccinimide.

Fujimoto et al. in U.S. Pat. No. 3,846,380 describe the formation of modified polypeptides having hydrophobic and hydrophilic substituents as side chains obtained by reacting polysuccinimide with at least one primary or secondary aliphatic amine in a polar aprotic solvent and hydrolyzing the resulting polyamide derivative with alkali to produce polypeptides that are useful as surface active agents.

Reactions of polysuccinimide in an aqueous medium with aqueous ammonia or aqueous primary or secondary amines produces copolymers of aspartic acid ammonium salts and aspartamide units. For example, hydrolysis of polysuccinimide with aqueous ammonia affords a copolymer of aspartamide (a.k.a. asparagine) and ammonium aspartate units in a ratio of about 40:60 to about 60:40.

Acidic amino acid copolymers containing co-monomers such as polybasic carboxylic acids and anhydrides, fatty acids, polybasic hydroxycarboxylic acids, monobasic polyhydroxycarboxylic acids, aliphatic amines, diamines and triamines, polyamines, carbohydrates, sugar carboxylic acids, amino acids, non-protein forming aminocarboxylic acids, lactams, lactones, diols, triols, polyols, unsaturated monocarboxylic, dicarboxylic and tricarboxylic acids, can be made by any number of methods described in the literature.

See, for example, U.S. Pat. No. 5,478,919, to Koskan et al., incorporated herein by reference, which describes a method of preparation of copolymers of polysuccinimide or polyaspartic acid by copolymerization of maleic or fumaric acid, ammonia and one or more amino, hydroxyl or carboxyl containing monomers; U.S. Patents to Wood, U.S. Pat. No. 5,510,427 which describes a method of preparing polyaspartate copolymers by polymerization of maleic acid, and ammonia with a diamine or triamine, followed by hydrolysis with base; U.S. Pat. No. 5,494,995 which describes a method of preparing polysuccinimide copolymers by polymerization of maleic acid, ammonia and a polycarboxylic acid, and optionally with a diamine or triamine; and U.S. Pat. No. 5,484,860 which describes a method of preparing polyaspartate copolymers by polymerization of maleic acid, ammonia and a polycarboxylic acid, and optionally with a diamine or triamine, followed by hydrolysis with base.

Also, U.S. Pat. No. 4,696,981 to Harada describes the copolymerization maleic or fumaric acid, ammonia and one or more amino acids using microwave heating, to form polysuccinimide copolymers; U.S. Pat. No. 4,892,733, to Bichon et al. describes copolymers of aspartic or glutamic acid with other natural amino acids; U.S. Pat. No. 5,747,635, to Kroner et al., describes a method of preparing copolymers of polysuccinimide and polyaspartic acid by copolymerization of aspartic acid with 99 to 0.1 mole % of one or more polybasic carboxylic acids, polybasic carboxylic acid anhydrides, fatty acids, polybasic hydroxycarboxylic acids, monobasic polyhydroxycarboxylic acids, diamines and triamines, polyamines, carbohydrates, sugar carboxylic acids, amino acids, non-protein forming aminocarboxylic acids, or by radically initiated graft polymerization of mono-ethylenically unsaturated carboxylic acids in the presence of polyaspartic acid; and U.S. Pat. No. 5,679,761 to Heuer et al. which describes copolymers of polyaspartate or polysuccinimide with iminodisuccinate units. The relevant portions of each of the foregoing patents are incorporated herein by reference.

Examples of co-monomers useful in the acidic amino acid co-polymers of the present invention include, but are not limited to, lactic acid, citric acid, glycolic acid, malic acid, tartaric acid, succinic acid, adipic acid, butanetetracarboxylic acid, gluconic acid, glucuronic acid, glucaric acid, aconitic acid, sulfosuccinic acid, phosphinicosuccinic acid, phosphonosuccinic acid, iminodiacetic acid, iminodisuccinic acid, nitrilotriacetic acid, stearic acid, palmitic acid, cyclohexanedicarboxylic acid and anhydride, terephthalic acid, phthalic acid and anhydride, crotonic acid, sorbitol, glycerol, glucose, fructose, sucrose, maltose, glycine, alanine, serine, threonine, cystine, cysteine, ethylenediamine, diethylenetriamine, triethylenetetramine, polyamines, 1,6-diaminohexane, octadecylamine, 6-aminocaproic acid, 4-aminobutyric acid, diaminocyclohexane, urea, melamine, carbohydrazide, hydrazine, ascorbic and isoascorbic acid, sorbic acid, maleuric acid, cyanuric acid, alkyldiamines, alkyltriamines, acrylic acid, methacrylic acid, maleic acid, maleic anhydride, alkylmaleic acids, alkenylsuccinic acids and anhydrides thereof, and methylenemalonic acid. The term "alkyl" and "alkanyl" as used herein means that the alkyl of alkanyl group has 1 to 7 carbon atoms.

Examples of derivatized aspartic acid and derivatized glutamic acid residues include materials in which the free carboxyl group of the aspartic acid or glutamic acid residue has been chemically bonded with an amino, hydroxyl or mercapto containing moiety to form an amide, ester or thioester bond.

Non-limiting examples of acidic amino acid polymers containing derivatized aspartic acid or glutamic acid residues useful in the compositions and methods of the present invention are found in U.S. Patents to Uhr et al., U.S. Pat. Nos. 5,506,335 and 5,726,280 which describe polyaspartate alkyl and aryl amide derivatives with sulfonic acid group-containing side chains on the alkyl or aryl moieties; U.S. Patents to Jacquet et al., U.S. Pat. No. 4,363,797 which describes derivatized polyaspartates bearing amide, mercapto and sulfoalkylamide functional group bearing moieties attached to the polyaspartate by amide bonds to the free carboxyl groups of the polymer; and U.S. Pat. No. 4,314,808 which describes derivatized polyaspartates wherein alkyl substituents, functionalized alkyl substituents, dyes and dye precursors that are attached to the polyaspartate by amide bonds to the free carboxyl groups of the polymer; U.S. Pat. No. 3,846,380 to Fujimoto, which describes derivatized polyaspartates wherein $C_1$ to $C_{20}$ alkyl groups, in proportions from 0.005 to 1 substituents per monomer unit, are attached to the polyaspartate by amide bonds to the free carboxyl groups of the polymer. The relevant portions of each of the foregoing patents are incorporated by reference.

Also, U.S. Pat. No. 5,639,832, to Kroner et al, describes a method of derivatizing polysuccinimide with amino acids by reaction of polysuccinimide with amino acids in aqueous medium at pH values wherein at least 5% of the amino acids are in the free amine (non-protonated) form; and PCT Application No. WO 96/04332, to Greindl et al., describes derivatives of polyaspartic acid having hydroxamic acid, hydroxamic ether and/or hydrazide groups in the side chain, formed by reaction of polysuccinimide with hydroxylamine, hydroxylamine alkyl ethers with 1 to 18 C atoms in the alkyl group, N-mono-hydroxylamines with 1 to 18 C atoms in the alkyl group, and/or hydrazine in aqueous or alcohol media at pH values of at least 7. The relevant portions of each of the foregoing patents are incorporated by reference.

Examples of amino, hydroxyl or mercapto containing moieties that may be bonded with aspartic acid or glutamic acid residues to form derivatized aspartic acid or derivatized glutamic acid residues include, but are not limited to: hydrazine, $C_1$–$C_{20}$ alkyl or aryl substituted hydrazines, hydroxyl amine, $C_1$–$C_{20}$ alkyl O-substituted hydroxylamines, natural amino acids such as alanine, glycine, leucine, phenylalanine, lysine, non-natural amino acids such as 6-aminocaproic acid, 4-aminobutyric acid, 2-aminobenzoic acid, 4-aminobenzoic acid, or iminodiacetic acid, $C_1$–$C_{20}$ alkyl amines, aryl amines such as aniline, secondary alkyl amines such as dimethylamine, morpholine, diethylamine, or N-methylstearylamine, substituted alkyl or aryl amines such as taurine, 3-phosphinopropyl amine, or 4-aminobenzenesulfonic acid, heterocyclic amines such as 2-aminopyridine, 2-aminopyrazine, 2-aminothiazole, or 2-aminoimidazole, diamines such as ethylenediamine, hexamethylenediamine, or alkoxylated diamines such as triethyleneglycol diamine, alkoxylated amines such as amine capped polyethylene oxides or amine capped polypropylene oxides, polyols such as ethylene glycol, propylene glycol, glycerin, polyethylene oxides, polypropylene oxides, sugars, or amino sugars, thiols such as butanethiol, 2-hydroxyethanethiol, or 2-aminoethanethiol, and hydoxycarboxylic acids such as glycolic acid, lactic acid, 2-hydroxybutyric acid, citric acid, tartaric acid, or salicylic acid.

Preferred amino acids for preparing acidic amino acid polymers useful in the present invention are aspartic acid, glutamic acid or mixtures thereof and the sum of the residues of aspartic acid or glutamic acid or both is at least about 20%, more preferably, at least about 30%, most preferably at least about 50% of the total number of polymeric residues.

The starting materials, i.e., the amino acids and other co-monomers, for the polymerization to form the acidic amino acid polymers of the present invention can exist as optical isomers, depending upon their respective structures, and can be polymerized either as a racemic mixture or as segregated optical isomers.

The aspartic acid moieties of the acidic amino acid polymers of the present invention may be synthesized by any of several methods known in the art, such as from the thermal polymerization of aspartic acid or of precursors of aspartic acid such as maleamic acid, fumaramic acid, ammonium salts of maleic acid, ammonium salts of fumaric acid and ammonium salts of malic acid. The acidic amino acid polymers can also be synthesized by microbial fermentation.

In agricultural applications to inhibit corrosion of metal equipment in contact with fertilizer solutions, the inventive composition containing at least one molybdate or zinc salt and the acidic amino acid polymers can be supplied in the form of an aqueous solution or a substantially solid form. The weight ratio of the acidic amino acid polymer to molybdate and zinc salts can be in the range of about 0.1:1 to about 1,000,000:1, preferably in the range of about 20:1 to about 100,000:1.

When supplied as an aqueous composition, the content, on a total composition basis, of acidic amino acid polymer preferably is in the range of about 0.001% (10 ppm) to about 10% (100,000 ppm) by weight and the content of the metal salt is in the range of at least about 0.00001% (0.1 ppm) to about 0.01% (100 ppm) by weight. More preferably, the inventive aqueous composition to be supplied has an acidic amino acid polymer content in the range of about 0.001% (10 ppm) to about 10% (100,000 ppm) by weight, a molybdate salt content of at least about 0.00001% (0.1 ppm) to about 0.001% (10 ppm) by weight or a zinc salt concentration of at least about 0.00001% (0.1 ppm) to about 0.0005% (5 ppm) by weight or a combined molybdate and zinc salt concentration of at least about 0.00001% (0.1 ppm) by weight. A most preferred composition has an acidic amino acid polymer content of about 0.5% (5000 ppm) to about 5% (50,000 ppm) by weight and at least one molybdate or zinc salt in about 0.0001% (1 ppm) to about 0.001% (10 ppm) by weight, i.e., a weight ratio range of about 500:1 to about 50,000:1. Preferably, the pH of the composition is in the range of about 6 to about 14 pH units.

Fertilizer solutions containing the inventive composition can also contain plant nutrients, such as potassium, phosphorus, nitrogen and sulfur. Most preferably, the fertilizer solution contains urea and ammonium nitrate (referred to as UAN). Such plant nutrients can be supplied together with the acidic amino acid polymer and at least one molybdate or zinc salt for agricultural uses. Advantageously, the molybdate salts and zinc salts useful in the inventive composition can provide, respectively, the plant micro nutrients, molybdenum and zinc. Preferably the pH of the composition is in the range of about 6 to about 14 units, more preferably in the range of about 7 to about 9 units.

The compositions and method of the present invention are particularly useful in industrial water treatment applications such as open recirculating cooling towers, boilers and the like, where both scale and corrosion problems, particularly of ferrous metals, occur in the same system, simultaneously.

In an industrial aqueous system, the weight ratio of the acidic amino acid polymer to the at least one molybdate or zinc salt can be in the range of about 0.01:1 to about 1,000:1, preferably in the range of about 1:1 to about 500:1, more preferably in the range of about 2:1 to about 25:1. Preferably, an industrial aqueous system will contain an acidic amino acid polymer content in the range of about 0.00001% (0.1 ppm) to about 0.01% (100 ppm) by weight and at least one molybdate or zinc salt in the range of about 0.00001% (0.1 ppm) to about 0.001% (10 ppm) by weight. A preferred composition contains, on a total composition weight basis, an acidic amino acid polymer content of about 0.0001% (1 ppm) to about 0.005% (50 ppm) by weight and molybdate or zinc salt content of about 0.00002% (0.2 ppm) to about 0.0005% (5 ppm) by weight, i.e., a weight ratio of polymer to salt of about 250:1 to about 0.2:1. A preferred pH range of the composition is about 6 to about 14 units.

Other common water treatment components, such as biocides, dispersants, sequestrants, other scale inhibitors or other corrosion inhibitors, and mixtures thereof may be supplied along with the acidic amino acid polymer and the molybdate or zinc salt in the inventive composition. Useful formulations, for examples, can contain polyaspartate, metal salts and phosphonate sequestrants, wherein the added phosphonate sequestrants may further enhance either the scale inhibition or corrosion activity of the formulation.

The scale inhibiting activity of poly(amino acids) is well known. One other useful feature of such amino acid polymers is low calcium sensitivity. Calcium sensitivity is the tendency of an inhibitor to precipitate as a calcium salt in waters having a high calcium hardness. Such precipitation is undesirable in that the precipitated inhibitor can no longer perform its intended function.

Calcium sensitivity may be measured in a relatively simple test wherein a known amount of inhibitor (typically enough to attain 50 ppm concentration in solution) is added to a water composition containing about 500 ppm of calcium (as calcium carbonate), 0.005M borate buffer at a temperature of about 70° C. (about 158° F.), pH 8.3 for an incubation time of about 18 hours. The turbidity of the solution is monitored using a nephelometer. Turbidity is measured in Nephelometric Turbidity Units (NTU). Turbidity is an indication of precipitation. Higher turbidity indicates high calcium sensitivity. In such a test, an amino acid polymer of polyaspartic acid, showed no measurable turbidity, whereas common non-amino acid based scale inhibitors such as polyacrylic acid and polymaleic acid had measureable turbidities of 8 and 13 NTU, respectively, indicating low calcium sensitivity for polyaspartate and high calcium sensitivity for the polyacrylate and polymaleates.

The activity of corrosion inhibitors toward metal corrosion is commonly assayed by the Polarization Resistance Method, ASTM G-59, found in "Standard Practice for Conducting Potentiodynamic Polarization Resistance Measurements," American Society For Testing And Materials, Philadelphia, Pa., the disclosures of which are incorporated herein by reference. Linear Polarization Resistance is an electrochemical technique that measures the DC current ($i_{meas}$) through the metal/fluid interface under study by applying a small electric potential difference ($\Delta E$) from the corrosion potential ($E_{corr}$). $I_{maes}$ is related to corrosion current density ($i_{corr}$) by the Stern-Geary equation:

$$\frac{\Delta E}{i_{meas}} = \frac{\beta_a \beta_c}{(2.303\ i_{corr})(\beta_a + \beta_c)}$$

where: $\beta_a$=Anodic Tafel Slope and $\beta_c$=Cathodic Tafel Slope.

The corrosion rate is directly proportional to the corrosion current density, and can be calculated using the ASTM G-102 standard method, found in "Calculation of Corrosion Rates and Related Information From Electrochemical Measurements," American Society For Testing And Materials, Philadelphia, Pa., the disclosures of which are incorporated herein by reference.

The following examples illustrate composition embodiments and the method of the present invention in agricultural fertilizer solutions and in industrial aqueous systems. The compositions and methods presented are illustrations of preferred embodiments and are not intended as limitations.

EXAMPLE 1

Inhibition of Steel Corrosion in an Acueous Fertilizer Solution by Acidic Amino Acid Polymer and Zinc Salt The corrosion rate of C1010 mild steel coupons submerged in an aqueous fertilizer solution was monitored using the Polarization Resistance Method. The analytical instrument contained a two-electrode probe which provided the corrosion rates as milli-inches per year (mpy).

The control sample was a 28% by weight aqueous solution of the commercial fertilizer, urea and ammonium nitrate (UAN), commonly employed in the agriculture industry and is known to be metal corrosive, especially to ferrous metals. The corrosion rate of separate steel coupons was measured following immersion contact in a series of tests performed with the UAN fertilizer solution containing either thermal polyaspartate, (TPA), as the acidic amino acid polymer (5000 molecular weight, sodium salt form), or zinc chloride or TPA and zinc chloride and the results were compared to corrosion in contact with the control sample.

The concentration of the aspartic acid polymer in the test aqueous solutions ranged from about 1% (10,000 ppm) to about 0.001% (10 ppm) by weight and the concentration of zinc chloride was about 0.0002% (2 ppm) by weight as shown in Table 1 below. All compositions had a pH of about 8.4. Measurements were made at ambient room temperature over an immersion period of 4 to 28 days. The results are summarized in Table 1.

TABLE 1

Corrosion Inhibition of Mild Steel

Treatment
Corrosion rate (mpy)
Milli-inches/year

| Day | urea ammonium $NO_3$ UAN alone (28%) | 1% TPA (10000 ppm) | 2 ppm $ZnCl_2$ | 1% TPA + 2 ppm $ZnCl_2$ | 5000 ppm TPA + 2 ppm $ZnCl_2$ | 1000 ppm TPA + 2 ppm $ZnCl_2$ | 50 ppm TPA + 2 ppm $ZnCl_2$ | 25 ppm TPA + 2 ppm $ZnCl_2$ | 10 ppm TPA + 2 ppm $ZnCl_2$ |
|---|---|---|---|---|---|---|---|---|---|
| 1 | 0.3 | 0.7 | 0 | 0.1 | 0 | 0 | 0 | 0.1 | 0.1 |
| 2 | 0.1 | 0 | | | | | | | |
| 3 | 0.1 | 0 | | | | | | | |
| 4 | 80.4 | 0 | 0.1 | 0 | 0 | 0 | 0 | 0.1 | 0 |
| 5 | | 0.1 | | | 0 | 0 | 0 | 0.1 | 0.1 |
| 6 | | | 0.1 | 0.1 | 0 | 0 | 0 | 0.1 | 0 |
| 7 | | | 0 | 0 | 0 | 0 | 0 | 0.1 | 0.1 |
| 8 | | 2.4 | 0.1 | 0.1 | 0 | 0 | 0 | 0.1 | 0 |
| 9 | | 2.8 | | | | | | | |
| 10 | | 2.4 | | | | | | | |
| 11 | | | 0 | 0 | | 0 | | | |
| 12 | | 2.6 | 0.1 | 0.1 | 0 | 0 | 0 | 0.1 | 0 |
| 13 | | | 90.8 | 0 | 0 | 0 | 0 | 0.1 | 0.1 |
| 14 | | | | | 0 | 0 | 0 | 0.1 | 0.1 |
| 15 | | | | | 0 | 0 | 0 | 0.1 | 0 |
| 16 | | | | | | | | | |
| 17 | | | | | | | | | |
| 18 | | | | 0 | 0 | 0 | 0 | 0.1 | 0.1 |
| 19 | | | | | | | | | |
| 20 | | | | | 0 | 0 | 0 | 0.1 | 0.1 |
| 21 | | | | | 0.1 | 0 | 0 | 0.1 | 0 |
| 22 | | | | | 0.1 | 0 | 0 | 0.1 | 0.1 |
| 23 | | | | | | | | | |
| 24 | | | | | | | | | |
| 25 | | | | | 0.2 | 0.2 | 0.1 | 0 | 0 |
| 26 | | | | | 0.2 | 0.2 | 0.1 | 0.1 | 0.1 |
| 27 | | | | | 0.2 | 0.2 | 0.2 | 0.1 | 0 |
| 28 | | | | | 0.1 | 0.2 | 0.2 | 0.1 | 0.1 |
| 29 | | | | | 0.2 | 0.2 | 0.2 | 0 | 0 |

The data in Table 1 clearly showed that corrosion inhibition by the combination of the polyaspartate with zinc salt was considerably more effective than that achieved with either the polymer alone or the zinc salt alone. The UAN control produced massive corrosion within 4 days (80.4 mpy). Polyaspartate (1%) alone decreased the corrosion rate during the first 7 days and produced "slight corrosion" (mpy value of 2.4–2.6) over 8–14 days, whereas massive corrosion (90.8 mpy) was produced with zinc salt (2 ppm) alone after by 13 days. With all the inventive compositions containing the combination of polyaspartate and zinc chloride, however, the corrosion rates surprisingly ranged from none (0 mpy) to at most about 0.2 mpy over the entire 29 day test period.

Similarly effective inhibition was achieved in similar tests conducted over a test period of 30 days, with 1 ppm zinc salt in combination with 10 ppm, 25 ppm, 50 ppm or 100 ppm polyaspartate.

EXAMPLE 2

Corrosion Inhibition by Acidic Amino Acid Polymer and Molybdate Salt in a Fertilizer Solution The procedure of Example 1 was repeated, except that the UAN fertilizer (28% by weight) compositions contained either 1% by weight of sodium polyaspartate, (5000 Mw), or 0.0005% by weight sodium molybdate (5 ppm) or a combination of 1% by weight sodium polyaspartate and 0.0005% by weight sodium molybdate at a pH of about 8.4. After 12 days of immersion contact, no corrosion (0 mpy) of the C1010 mild steel coupons was evident when the inventive composition containing the polymer and molybdate salt was used. In contrast, severe corrosion of the coupons was evident after 4 days immersion contact with the control sample (UAN only, 80 mpy) and after 7 days immersion contact with the sodium molybdate sample (87 mpy), whereas the aspartic acid polymer sample had only slight corrosion after 8–12 days (2.4–2.6 mpy).

EXAMPLE 3

Corrosion Inhibition by Acidic Amino Acid Polymer with Molybdate and Zinc Salt in a Cooling Water Application Water used for cooling applications is typically described as scale forming or corrosive, primarily depending on the concentration of hardness ions in the water and the alkalinity. Low hardness waters (low LSI), are usually significantly more corrosive than higher hardness waters (high LSI).

This example demonstrates corrosion inhibition by acidic amino acid polymer with molybdate and zinc salt in an aggressive soft water (substantially low LSI) containing about 35 ppm $Ca^{+2}$ as $CaCO_3$, about 10 ppm $Mg^{+2}$ as $CaCO_3$ and about 25 ppm total alkalinity to simulate the cooling water used in open recirculatory cooling towers (hereafter, "cooling water"). Total alkalinity was determined as M-alkalinity (i.e., titration with acid to a Methyl Orange indicator endpoint). The cooling water had a pH of about 8.0 and a temperature of about 27° C. (about 81° F.). The cooling water was constantly purged with air to ensure oxygen saturation to simulate open recirculation tower conditions.

A series of separate tests were performed over a test run period of about 18 hours employing either cooling water (blank), or cooling water containing (0.001%) 10 ppm polyaspartate with and without zinc chloride or sodium molybdate salt in the amounts shown in Table 2. All tests were performed on C1010 mild steel coupons that had been pre-corroded in 1 N hydrochloric acid for about 10 minutes and then rinsed with deionized water to simulate tower metal use conditions. The flow rate during pre-corrosion and each test was about 1 m/s (3.3 ft/s).

The corrosion rate was determined by the Polarization Resistance Method as in Example 1 and by visually observing the appearance of the metal surface for pitting and general corrosion (rust). The results are presented in Table 2.

TABLE 2

The Corrosion Rate Of C1010 Mild Steel
In Cooling Water With Various Treatments

| Treatment | Corrosion Rate (mpy) | Appearance, Observed Pitting |
|---|---|---|
| Blank | 52 | large amount of general corrosion (rust), pitting |
| 10 ppm polyaspartate | 2.5 | large pits, reduced rust |
| 10 ppm polyaspartate + 1 ppm $Zn^{+2}$ | 2.0 | small pits, greatly reduced rust |
| 10 ppm polyaspartate + 0.4 ppm $Zn^{+2}$ | 2.0 | small pits, greatly reduced rust |
| 10 ppm polyaspartate + 5 ppm $MoO_4^{-2}$ | 1.5 | small pits, little rust |
| 10 ppm polyaspartate + 0.4 ppm $Zn^{+2}$ + 5 ppm $MoO_4^{-2}$ | 1.6 | small pits, very little surface rust |
| 2 ppm $Zn^{+2}$ | 8.4 | large pits |

The data in Table 2 illustrate the efficacy of polyaspartate as a corrosion inhibitor and provides an indication of potential synergistic effects with molybdate in lowering corrosion rates and with zinc in reducing pitting corrosion. The advantages of combining polyaspartate with molybdate salts, zinc salt or both were depicted by comparing the surface morphologies of the treated coupons. The data in Table 2 clearly show that combinations of polyaspartate and zinc salt, for example, unexpectedly reduced corrosion attack and pitting was minimized relative to that of the zinc salt treatment. It is well known that at a low level of 1 ppm or less the corrosion rate of $Zn^{+2}$ is greater than that at 2 ppm (i.e., 8.4 mpy). Thus, the combination of polyaspartate and $Zn^{+2}$ advantageously achieved a low corrosion rate employing a fraction of the zinc which would be needed if zinc were used alone to reduce the corrosion rate to the same level.

The combination of polyaspartate with molybdate salt or with a combination of zinc and molybdate salts resulted in a high level of inhibition of both general corrosion and pitting attack. It is well known that 5 ppm $MoO_4^{-2}$ is not an effective corrosion inhibitor.

The potential Polarization data indicates that polyaspartate acts as an anodic inhibitor. Thus, the anodic Tafel slope of the mild steel coupon doubles when treated with 10 ppm of polyaspartate.

We claim:

1. A method for inhibiting the corrosion of ferrous metals in contact with a metal-corrosive aqueous system selected from the group consisting of aqueous fertilizer systems and low hardness water systems which comprises supplying to the aqueous system a corrosion-inhibiting amount of a composition comprising (i) a substantially water-soluble polymer of at least one acidic amino acid selected from the group consisting of aspartic acid and glutamic acid and (ii) at least one water-soluble salt selected from the group consisting of molybdate salts having an alkali metal cation and zinc salts having an anion derived from an inorganic mineral acid, the supplied weight ratio of component (i) to component (ii) being in the range of about 0.01:1 to about 1,000,000:1;

such that the corrosion inhibition is greater relative to the additive corrosion inhibition effects attributable to component (i) and component (ii).

2. The method of claim 1 wherein the molecular size of the acidic amino acid polymer is in the range of about 1,000 to about 100,000 daltons.

3. The method of claim 1 wherein the metal salt comprises sodium molybdate, zinc chloride and mixtures thereof.

4. The method of claim 1 wherein the acidic amino acid polymer is an aspartic acid polymer.

5. The method of claim 1 wherein the aqueous system has a pH in the range of about 6 to about 14.

6. The method of claim 1 wherein component (i) is a polymer of aspartic acid and the metal salt is sodium molybdate.

7. The method of claim 1 wherein component (i) is a polymer of aspartic acid and component (ii) is zinc chloride.

8. The method of claim 1 wherein component (i) is a polymer of aspartic acid and component (ii) is a mixture of sodium molybdate and zinc chloride.

9. A method for inhibiting the corrosion of ferrous metals in contact with a metal-corrosive aqueous fertilizer system containing urea and ammonium nitrate which comprises supplying a corrosion-inhibiting amount of a composition comprising (i) a polymer of aspartic acid and (ii) at least one water-soluble salt selected from the group consisting of molybdate salts having an alkali metal cation and zinc salts having an anion derived from an inorganic mineral acid, the supplied weight ratio of component (i) to component (ii) being in the range of about 0.1:1 to about 1,000,000:1;

such that the corrosion inhibition is greater relative to the additive corrosion inhibition effects attributable to component (i) and component (ii).

10. The method of claim 9 wherein the molecular size of the polyaspartic acid is in the range of about 1,000 to about 100,000 daltons.

11. The method of claim 9, wherein, based on the total weight of aqueous fertilizer system, the supplied composition provides about 0.001% to about 10% by weight aspartic acid polymer, and at least about 0.00001% by weight of the metal salt.

12. The method of claim 9 wherein the metal salt is zinc chloride.

13. The method of claim 9 wherein the metal salt is sodium molybdate.

14. The method of claim 9 wherein the aqueous fertilizer system has a pH in the range of 7 to 9.

15. The method of claim 9 wherein the composition is supplied in the form of a liquid or solid.

16. A method for inhibiting the pitting corrosion of ferrous metals in contact with a metal-corrosive low hardness water system which comprises supplying a corrosion-inhibiting amount of a composition comprising (i) a polymer of aspartic acid and (ii) at least one water-soluble salt selected from the group consisting of molybdate salts having an alkali metal cation and zinc salts having an anion derived from an inorganic mineral acid, the supplied weight ratio of the acidic amino acid polymer to the metal salt being in the range of about 0.01:1 to about 1,000:1;

such that the inhibition in pitting corrosion is greater relative to the additive inhibition effects in pitting corrosion attributable to component (i) and component (ii).

17. The method of claim 16 wherein the molecular size of the aspartic acid polymer is in the range of about 1000 to about 100,000 daltons.

18. The method of claim 16 wherein the metal salt is sodium molybdate.

19. The method of claim 16 wherein the metal salt is zinc chloride.

20. The method of claim 16 wherein the metal salt comprises sodium molybdate and zinc chloride.

21. The method of claim 16 wherein, based on a total weight of the low hardness water system, the supplied composition provides about 0.00001% to about 0.01% aspartic acid polymer, and at least about 0.00001% by weight of the metal salt.

22. The method of claim 16 wherein, based on a total weight of the low hardness water system, the supplied composition provides about 0.0001% to about 0.005% aspartic acid polymer, and at least about 0.00001% by weight of the metal salt.

23. The method of claim 16 wherein the low hardness water system is an open recirculating cooling water system operated at a pH of about 8.

* * * * *